United States Patent [19]

Shibata

[11] 4,367,546
[45] Jan. 4, 1983

[54] VACUUM TURNTABLE SYSTEM FOR A RECORD PLAYER

[75] Inventor: Norio Shibata, Yokohama, Japan

[73] Assignee: Victor Company of Japan, Limited, Yokohama, Japan

[21] Appl. No.: 228,924

[22] Filed: Jan. 27, 1981

[30] Foreign Application Priority Data

Jan. 29, 1980 [JP] Japan ................................ 55-9345[U]
Jan. 31, 1980 [JP] Japan ............................. 55-11040[U]
Jan. 31, 1980 [JP] Japan ............................. 55-11041[U]
Jan. 31, 1980 [JP] Japan ............................. 55-11042[U]
Mar. 13, 1980 [JP] Japan ............................. 55-32665[U]
Mar. 13, 1980 [JP] Japan ............................. 55-32666[U]

[51] Int. Cl.³ .............................................. G11B 3/60
[52] U.S. Cl. .................................................. 369/271
[58] Field of Search ............................... 369/270, 271

[56] References Cited

U.S. PATENT DOCUMENTS 1,906,629  5/1933  Knight et al. ...................... 369/270
3,608,909  9/1971  Rabinow ............................ 369/271
4,065,135  12/1977  Doughty ............................ 369/271
4,234,195  11/1980  Shibata ............................ 369/270

FOREIGN PATENT DOCUMENTS 54-126002  9/1979  Japan ................................... 369/271

Primary Examiner—Steven L. Stephan
Attorney, Agent, or Firm—Lowe, King, Price & Becker

[57] ABSTRACT

The spindle of a turntable body comprises a top member having a projection to be fitted in a center hole of a phonograph record, and a generally cylindrical spindle body partially received in a cylindrical bearing. The top member has a turntable mount, whose outer diameter is greater than the projection, and a plurality of a radial passageways are made therein, which passageways communicate with a vacuum source. The lower end of the spindle body, which is made of two elements of different material so that machining is easy, is closed in one embodiment so as to be supported on a relatively small ball bearing. A spindle body having an open end is used in another embodiment. The ball bearing may be replaced with a pointed end of the spindle body. Means for tightening the air seal around a lubricant in the cylindrical bearing is provided for isolating the lubricant from the moving air lead to the vacuum source. A turntable sheet for attracting differently sized records to the turntable is provided with radial and circular grooves on both sides, and may be placed on the turntable body.

51 Claims, 27 Drawing Figures

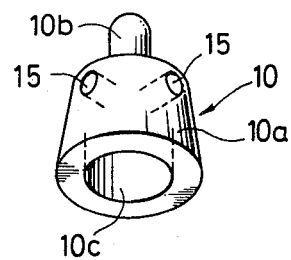
FIG. 3
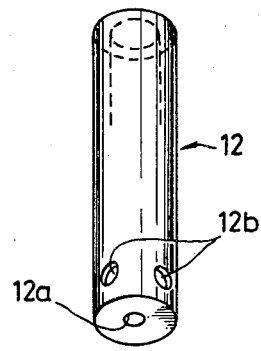
FIG. 4
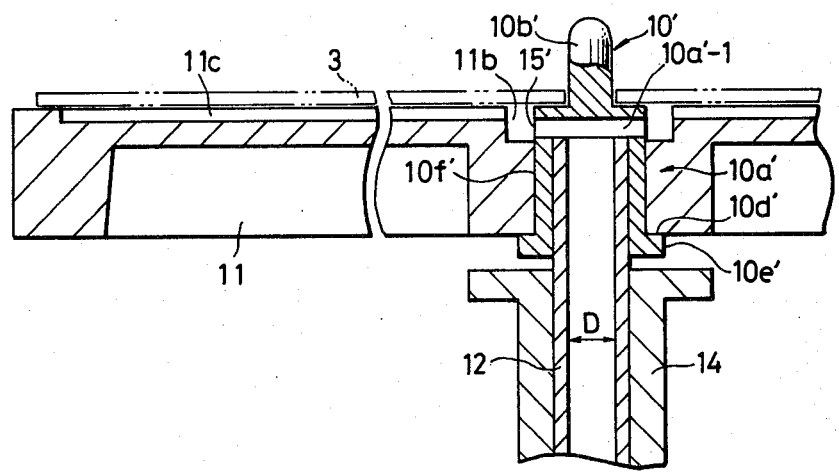

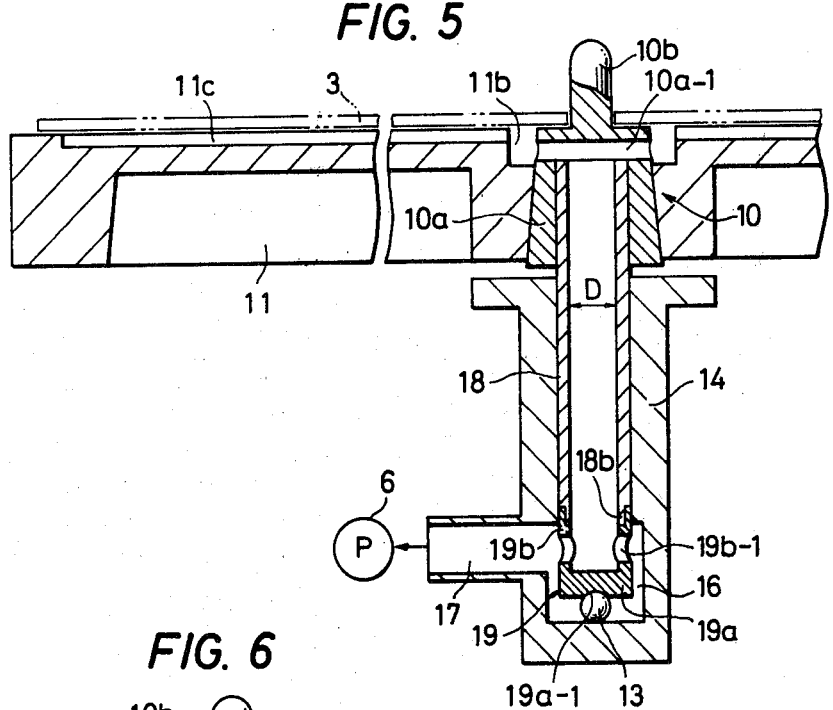
FIG. 5
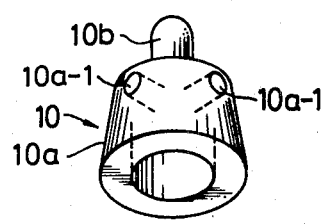
FIG. 6
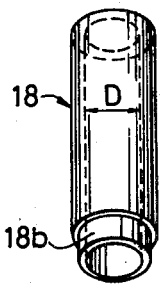
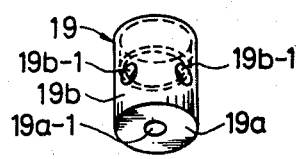

VACUUM TURNTABLE SYSTEM FOR A RECORD PLAYER

FIELD OF THE INVENTION

This invention generally relates to a turntable system for a record player, and more particularly the present invention relates to an improvement in a turntable system of the type arranged to attract a phonograph record to a turntable body by a vacuum force applied between the phonograph record and the upper surface on the turntable body.

BACKGROUND OF THE INVENTION

In a conventional turntable system for a record player of the type arranged to evacuate the air between the turntable body and the phonograph record placed on the turntable body, a turntable assembly having main and sub turntables is used because the air on the upper surface of the turntable assembly is led through passageways provided between the main and sub turntables to a duct which is made in a stationary shaft of the sub turntable. This conventional turntable assembly is complex in structure because it comprises man and sub turntables and auxiliary elements such as sealing pads on the surface of the main turntable, resulting in a high manufacturing cost.

The inventor of the present invention devised a new turntable system prior to the present invention which new turntable system is simple in construction. According to the new turntable system a rotary spindle is received in a bearing, and a turntable body is telescopically engaged, at its center hole with the spindle so as to rotate with the spindle. The spindle has a longitudinal passageway therein, and a plurality of passageways in radial directions, which plurality of passageways communicate with the longitudinal passageway at the top and the bottom of the longitudinal passageway. In other words, most of the spindle portions have a cylindrical shape, and the outside of the cylinder communicates with the inside of the same via the radial and longitudinal passageways. The turntable body of the previous invention has a circular recess around the center hole thereof, where the spindle has a projection arranged to be fitted in a center hole of a phonograph record. The turntable also has a plurality of grooves extending radially from the circular recess, and thus the air on the upper surface of the turntable is led via the grooves, the circular recess, the upper radial passageways, the longitudinal passageway and the lower radial passageways to the outside of the spindle. Namely, the lower radial passageways or openings of the spindle communicate with a suitable conduit communicating with a vacuum source, such as a vacuum pump. The diameter of the projection of the spindle is fixed to be less than about 7.15 millimeters to be fitted in the center hole of a record. For this reason, the inner diameter of the above-mentioned radial passageways as well as the number of the radial passageways are restricted by the outer diameter of the upper portion, i.e. the projection, of the spindle. Accordingly, the cross-sectional area of the upper passageways cannot be made large. As is well known, in order to obtain a high rate of airflow it is necessary to provide a large cross-sectional area of the passageway, and the airflow rate directly affects the attracting force applied to the photograph record. Especially, when a phonograph record is warped or bent, it is necessary to attract the phonograph record with a high rate of airflow to make it flat and to securely support the phonograph record on the turntable.

In addition, since the outer diameter of the spindle is fixed and is small, it is difficult to machine the same to make passageways therein. This results in a high manufacturing cost.

SUMMARY OF THE INVENTION

The present invention has been developed in order to improve the record attracting characteristic of a turntable system of the type arranged to attract a phonograph record by a vacuum force.

It is, therefore, an object of the present invention to provide a new and useful turntable system in which air on the turntable and/or on a turntable sheet, if provided, is sucked via a plurality of radial passageways made in a rotary turntable mount having a diameter which is greater than that of the spindle projection which engages with a center hole of a phonograph record, where the turntable mount and the spindle projection are integrally formed.

According to a feature of the present invention the turntable mount is fixedly engaged with a cylindrical spindle body which is partially received in a cylindrical bearing, and a ball bearing is interposed between the bottom of the cylindrical bearing and the lower or bottom end of the spindle body where the cylindrical spindle has either an open or a closed end at its bottom.

According to another feature of the present invention the cylindrical spindle body comprises a simply cylindrical body and a bottom member assembled with the simply cylindrical body so that the bottom member may be made of a material softer than that of the simply cylindrical body.

According to a further feature of the present invention means for air tightening a seal around lubricant placed between the ball bearing and the bottom of the cylindrical bearing, is provided.

According to a further feature of the present invention the ball bearing for supporting the spindle body is replaced with a pointed end of the spindle body.

According to a further feature of the present invention a turntable sheet is placed on the upper surface of the turntable body, which turntable sheet has circular or arc-like and radial grooves on both sides to effectively attract the turntable sheet to the turntable body and a phonograph record on the turntable sheet to the turntable sheet by a vacuum force.

According to a further feature of the present invention a turntable sheet, which can be adapted to two different sizes of phonograph records by simply turning it upside down, is employed in a turntable system.

In accordance with the present invention there is provided a turntable system for a record player of the type arranged to attract a phonographic record placed on a turntable body to said turntable body by a vacuum force applied through a passageway made inside a spindle of said turntable body, a projecion being arranged to protrude beyond the upper surface of said turntable body so as to be fitted in a center hole of said phonograph record, said turntable body being engaged with said spindle, characterized in that said spindle comprises a generally cylindrical spindle body, and a top member having said projection at the top thereof and a turntable mount integrally formed with said projection therebelow, said turntable mount having a bore therein for receiving a top portion of said cylindrical spindle body, said turntable mount having an outer diameter which is greater than that of said projection, a plurality of passageways being made in said turntable mount in substantially radial directions, said cylindrical spindle body having a longitudinal passageway communicating, at the top open end thereof, with said plurality of radial passageways of said top member and with a chamber in a cylindrical bearing, in which said spindle body is partially received, via openings made in the vicinity of the other end of said cylindrical spindle body, and in that said turntable body comprises a recess around its center hole which is telescopically engaged with the outer surface of said turntable mount, said recess having a given depth so that the space defined by said recess communicates with said plurality of radial passageways of said turntable mount.

In accordance with the present invention there is also provided a turntable system for a record player of the type arranged to attract a phonograph record placed on a turntable body to said turntable body by a vacuum force applied through a passageway provided inside a spindle of said turntable body, a projection being arranged to protrude beyond the upper surface of said turntable body so as to be fitted in a center hole of said phonograph record, said turntable body being engaged with said spindle, characterized in that said spindle comprises a generally cylindrical spindle body, and a top member having said projection at the top thereof and a turntable mount integrally formed with said projection thereinbelow, said turntable mount having a bore therein for receiving a top portion of said cylindrical spindle body, said turntable mount being engaged with a center hole of said turntable body, said cylindrical spindle body having a closed end at the bottom thereof, said cylindrical spindle body being partially received in a cylindrical bearing, said cylindrical bearing having a chamber at the bottom thereof which communicates with the inside of said cylindrical spindle body via openings made in the vicinity of said closed end.

In accordance with the present invention there is further provided a turntable sheet for use with a turntable system of the type arranged to attract a phonograph record placed via said turntable sheet on a turntable body to said turntable body by a vacuum force applied through a passageway made inside a spindle of said turntable body, a projection being arranged to protrude beyond the upper surface of said turntable body so as to be fitted in a center hole of said phonograph record, said turntable body being engaged with said spindle, characterized in that said turntable sheet has a plurality of radial and circular or arc-like grooves on both sides thereof, said grooves on both sides communicating with each other via through-holes made in said turntable sheet.

BRIEF DESCRIPTION OF THE DRAWINGS

These features will be more readily apparent from the following detailed description of the preferred embodiments taken in conjunction with the accompanying drawings in which:

FIG. 3 is a schematic perspective exploded view of the spindle assembly shown in FIG. 2;

FIG. 4 is a schematic partially cross-sectional view of a second embodiment of the turntable system according to the present invention;

FIG. 5 is a schematic partially cross-sectional view of a third embodiment of the turntable system according to the present invention;

FIG. 6 is a schematic perspective exploded view of the spindle assembly shown in FIG. 5;

DETAILED DESCRIPTION OF THE PREFERRED EMBODIMENTS

Prior to describing the embodiments of the present invention, the above-mentioned turntable system which was devised by the inventor of the present invention prior to the present invention will be described for a better understanding of the features of the present invention which can be regarded as an improvement in the former invention.

Figure 1:
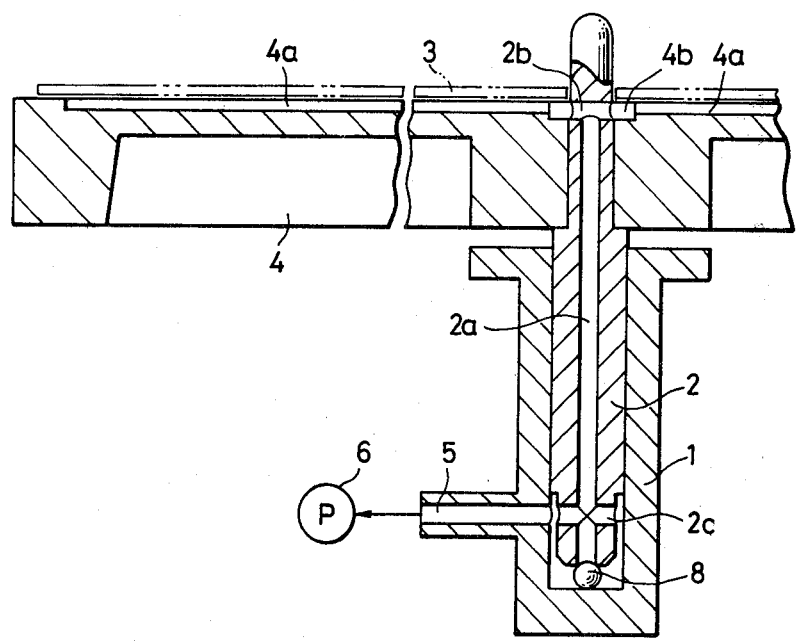
FIG. 1 is a schematic partially cross-sectional view of the turntable system for a record player invented by the present inventor prior to the present invention.

FIG. 1 illustrates a schematic partially cross-sectional view of the turntable system for a record player invented by the present inventor before the present invention. The turntable system of FIG. 1 comprises a cylindrical bearing 1, a rotary spindle 2, a turntable 4, a conduit 5 connected to the inside of the bearing 1 and a vacuum pump 6. The spindle 2 is partially received in the cylindrical bearing 1 and is rotatable therein, while a ball bearing 8 is interposed between the bottom of the cylinder of the bearing 1 and the lower end of the spindle 2. The lower portion or chamber of the cylinder of the bearing 1 communicates with the conduit 5 which is connected to the vacuum pump 6. The turntable 4 has a center hole which engages with the spindle 2. The outer surface of the spindle 2 is stepped in such a manner that the upper portion thereof is narrower than the lower portion of the same, and thus the turntable 4 is supported at the stepped portion of the spindle 2. A circular recess 4b is made around the center hole at the upper surface side of the turntable 4. A plurality of radial grooves 4a are also made on the upper surface of the turntable 4 and communicate with the circular recess 4b. A plurality of radial passageways 2b are made in the spindle 2 so as to communicate with the above-mentioned circular recess 4b of the turntable 4 when the turntable 4 is engaged with the spindle 2. The spindle 2 has a longitudinal passageway 2a which communicates with the radial passageways 2b at one end thereof, and with the outside of the spindle 2 at the other end via another radial passageways 2c. A phonograph record 3 is shown to be placed on the turntable 4, and with the above-described arrangement, the air between the phonograph record 3 and the upper surface of the turntable 4 is sucked and led via the grooves 4a, the circular recess 4b, the upper radial passageways 2b, the longitudinal passage way 2a, the lower radial passageways 2c, and the conduit 5 by the pump 6. As a result, the phonograph record 3 is attracted to the turntable 4 by the vacuum force.

In the above-described arrangement, it is to be noted that the outer diameter of the spindle 2 in the vicinity of the upper radial passageways 2b is equal to the outer diameter of the top projection of the spindle 2, which top projection is to be fitted in the center hole of the phonograph record 3. The present inventor has found that the above arrangement of the formerly invented turntable system suffered from the above-mentioned disadvantages because the diameter of the spindle 2 in the vicinity of the upper radial passageways 2b was too small.

Figure 2:
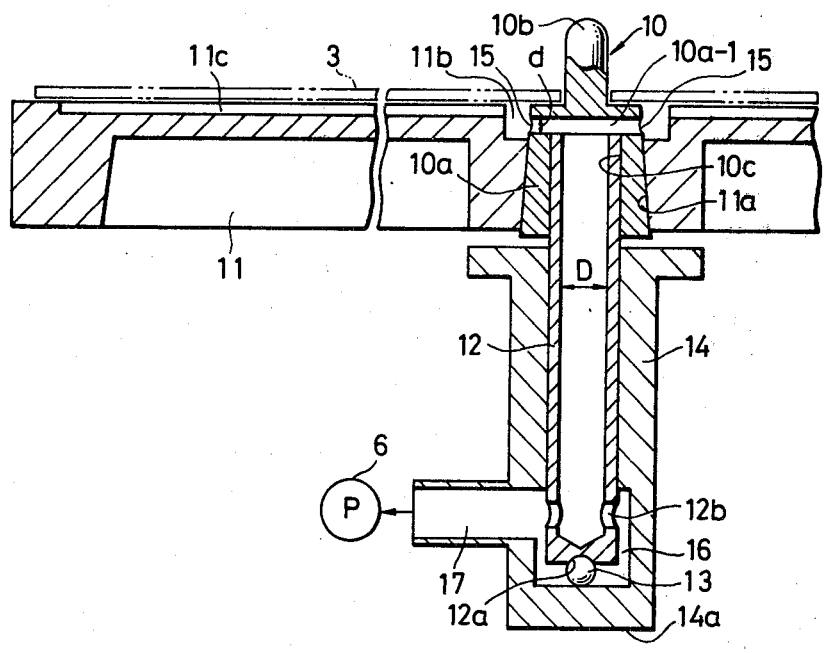
FIG. 2 is a schematic partially cross-sectional view of a first embodiment of the turntable system according to the present invention.

Reference is now made to FIG. 2 which shows a schematic partially cross-sectional view of a first embodiment of the turntable system according to the present invention. The turntable system of FIG. 2 comprises a cylindrical bearing 14, a spindle assembly 10 and 12, a turntable body 11, a conduit 17 and a pump 6. The arrangement of FIG. 2 greatly differs from the arrangement of FIG. 1 in that the spindle assembly 10 and 12, comprises a cylindrical spindle body 12 and a top member 10, in contrast with that the entire spindle 2 of FIG. 1 is integrally formed. Namely, as shown in FIG. 3 in the form of an exploded view, the cylindrical spindle body 12 is a metallic cylinder having a bottom of a closed end. A plurality of holes or openings 12b are made at the lower peripheral surface in such a manner that the holes 12b communicate with the inside of the spindle body 12. The top of the cylindrical spindle body 12 is not closed, and therefore, the inside of the spindle body 12 directly communicates with the exterior thereto at the top before assembly.

The top member 10 has a projection 10b at the top center thereof and a turntable mount 10a below the projection 10b. The projection 10b has a predetermined diameter so that the projection 10b is capable of being fitted in a center hole of a phonograph record 3 which is shown to be placed on the upper surface of the turntable body 11. The turntable mount 10a has a generally truncated-conical shape, and the smallest diameter thereof is greater than the diameter of the projection 10b. The turntable mount 10a is integrally formed with the projection 10b in such a manner that the projection 10b projects upwardly from the top surface of the frustum of the turntable mount 10a. The turntable mount 10a has a bore 10c inside thereof, which communicates with the exterior thereof at the bottom of the frustum. The projection 10b the turntable mount 10a and the bore 10c are all coaxial. A plurality of radial passageways 10a-1 are made in the turntable mount 10a so that the inside of the bore 10c of the turntable body 10a communicates with the exterior via the radial passageways 15. An upper portion of the above-mentioned spindle body 12 is telescopically received in the bore 10c of the turntable amount 10a where the spindle body 12 and the top member 10 are fixedly connected to rotate together.

The turntable body 11 is arranged to be supported by the outer periphery of the turntable mount 10a as shown in FIG. 2. Namely, the turntable body 11 has a center hole 11a whose diameter reduces in the direction from the lower surface side of the upper surface side thereof so that the turntable body 11 is securely supported by the turntable mount 10 when the turntable body 11 is placed in the right position to be telescopically engaged with the turntable mount 10. The engagement between the turntable body 11 and the turntable mount 10 will be referred to as a tapered arrangement.

The turntable body 11 has a circular recess 11b in the upper surface thereof around the center hole 11a. The diameter of the circular recess 11b is greater than the diameter of the top portion of the frustum of the turntable mount 10a. The circular recess 11b has a depth so that the openings of the radial passageways 15 are not blocked by the inner wall of the center hole of the turntable body 11 when the turntable body 11 is engaged with the turntable mount 10a. Accordingly, the spaced defined by the circular recess 11b and a phonograph disk 3 communicates with the inside of the spindle body 12 via the radial passageways 10a-1. A plurality of radial grooves 11c are made on the upper surface of the turntable body 11 and each groove 11c communicates, at one end thereof, with the circular recess 11b. Although it is not shown, other grooves, such as circular or arc-like grooves, in different directions may be further provided and connected to the radial grooves 11c.

The lower portion of the spindle body 12 is received in the cylindrical bearing 14. The cylindrical bearing 14 has a closed bottom 14a, and a ball bearing 13 made of steel is interposed between the bottom of the cylindrical bearing 14 and the lower or bottom end of the spindle body 12. A suitable recess 12a of semi-spherical or conical shape is made at the center of the lower end of the spindle body 12 so that the top portion of the ball bearing 13 is received in the recess 12a. The inner diameter of the cylinder of the bearing 14 is made a little greater in the vicinity of the bottom thereof than the remaining portion. With this arrangement the holes 12b are not blocked by the inner wall of the cylinder of the bearing 14. In other words, the lower portion of the cylinder of the bearing 14 constitutes a chamber 16, and in turn this chamber 16 communicates with the above-mentioned conduit 17 connected to the bearing 14. The conduit 17 is connected to the vacuum pump 6, and thus the air between the upper surface of the turntable body 11 and the phonograph record 3 is sucked via the grooves 11c, the circular recess 11b, the radial passageways 10a-1, the longitudinal passageway of the spindle body 12, the holes 12b, the chamber 16 and the conduit 17 by the pump 6.

The turntable mount 10a has an upper flat surface, and it is arranged such that the upper surface of the turntable mount 10a is flush with the upper surface of the turntable body 11 when the turntable body 11 is supported by the turntable mount 10a. In other words, the inner diameter and the slope of the tapered center hole of the turntable body 11 or the outer diameter and the slope of the tapered turntable mount 10a is selected so that the upper surface of the turntable mount 10a is flush with the upper surface of the turntable body 11.

Since the projection 10b and the turntable mount 10a of the top member 10 are integrally formed as described above, the center axes of the projection, the frustum of the turntable mount 10a and the bore 10c of the turntable mount 10a are readily aligned with each other with high accuracy. Furthermore, the axes of the turntable mount 10a and the cylindrical spindle body 12 are readily aligned with each other when assembled.

The smallest diameter of the frustum of the turntable mount 10a is selected to be over several times the diameter of the projection 10b. Therefore, it is possible to make the inner diameter of each of the radial passageways 10a-1 large enough without deteriorating the mechanical strength of the top member 10. Each radial passageway 10a-1 has the above-mentioned opening 15 at the periphery of the turntable mount 10a, and the openings 15 are exposed in the space defined by the circular recess 11b and the phonograph record 3. The total area of the openings 15 is equal to or greater than the cross-sectional area of the longitudinal passageway of the spindle body 12. Since the radial passageways 10a-1 are made in the frustum of the turntable mount 10a, the diameter of which is much greater than that of the projection 10b, machining of the top member 10 for making the radial passageways 10a-1 is much easier than the case of machining a small diameter spindle of FIG. 1.

As described in the above, since the total area of the openings 15 of the radial passageways 10a-1 is made much greater than that of FIG. 1, the airflow rate therethrough is not undesirably restricted. This means that the air between the upper surface of the turntable 11 and the phonograph record 3 can be sucked and thus exhausted at a flow rate, the maximum value of which is determined by the cross-sectional area of the longitudinal passageway of the spindle body 12. Accordingly, the attractive force by the vacuum supplied to the phonograph record 3 is much greater than in the arrangement of FIG. 1. Consequently, even though the phonograph record 3 has a warp, the record 3 can be securely attracted to the turntable 11.

In the above-described first embodiment of the turntable system of the present invention, no turntable sheet is used. Namely, the phonograph record 3 is directly placed on the upper surface of the turntable body 11. However, if desired, a suitable turntable sheet made of rubber, synthetic resin or the like may be employed as will be described hereinlater. When such a turntable sheet is used, the height of the upper surface of the turntable mount 10a may be flush with either the upper or lower surface of the turntable sheet. In the case that the upper surface of the turntable mount 10a is flush with the upper surface of the turntable sheet, the turntable sheet is not placed on the upper surface of the turntable mount 10 but only on the upper surface of turntable body 11, and therefore the upper surface of the turntable sheet as well as the upper surface of the turntable mount 10 is in contact with the phonograph record 3. On the other hand, in the case that the upper surface of the turntable mount 10a is flush with the lower surface of the turntable sheet, the turntable sheet is placed on both the upper surfaces of the turntable body 11 and the turntable mount 10 in the same manner as the phonograph record 3 of FIG. 2.

It will be understood from the foregoing that the airflow rate for sucking and attracting the phonograph record 3 on the turntable body 11 or on the turntable sheet placed on the turntable body 11 is increased compared to the arrangement of FIG. 1 because a plurality of large diameter radial passageways 10a-1 are provided. In addition, since no through-hole is made in the projection 10b having a relatively small diameter, the mechanical strength of the projection is not deteriorated at all. Furthermore, since the spindle assembly 10 and 12 comprises two parts, i.e. the top member 10 and the spindle body 12, manufacturing the same is easy, and machining the same is also simple.

As described in the above, the inner diameter of the spindle body 12 is made larger than that of FIG. 1. Although a larger inner diameter is desirable in view of flow rate, if the thickness of the cylindrical spindle body 12 is too thin, the mechanical strength of the entire spindle body 12 is insufficient. According to the present invention, however, the bottom portion of the cylindrical spindle body 12 is closed as shown in FIG. 2 so that the entire spindle body 12 is reinforced.

Furthermore, if the bottom end is not closed, and has an open end as shown in FIG. 1, a ball bearing having a large diameter must be used to support the spindle body 12 thereon. Namely, in the above case, the diameter of the ball bearing must be greater than the inner diameter of the spindle body 12. This results in an increase in cost and size. On the contrary, by using a closed bottom, the diameter of the ball bearing may be much smaller than the inner diameter of the spindle body 12 because only the conical or semi-spherical recess abuts against the upper portion of the ball bearing 13.

FIG. 4 illustrates a second embodiment of the turntable system according to the present invention. The second embodiment differs from the first embodiment of FIGS. 2 and 3 in that the turntable mount 10a' of the top member 10' is not of a truncated conical shape, and has a stepped portion 10d'. In detail, the turntable mount 10a' has a larger diameter portion 10e' at the bottom thereof so that the turntable body 11' is supported on the large diameter portion 10e'. The center hole of the turntable body 11 has a simply hollow cylindrical shape, where the diameter of the center hole is equal to or slightly greater than the outer diameter of a smaller diameter portion 10f' of the turntable mount 10a'. Other arrangements of the second embodiment is the same as those of the first embodiment, and therefore the description of the same is omitted.

FIG. 5 illustrates a partially cross-sectional view of a third embodiment of the turntable system according to the present invention. The third embodiment differs from the previous embodiments in that the spindle body comprises a cylindrical spindle 18 and a bottom member 19 to the contrary with that the spindle body 12 of FIG. 2 comprises a single member. In detail, as best seen in an exploded view of FIG. 6, the spindle assembly comprises a top member 10, which is the same as that of FIG. 2, the cylindrical spindle 18, and the bottom member 19. The cylindrical spindle 18 has open ends at both upper and lower ends there 18b in the vicinity of the lower end. In other words, the outer surface of the cylindrical spindle 18 has a stepped portion at the lower portion, while on the inner surface of the cylindrical spindle 8 is made no stepped portion.

The bottom member 19 comprises a bottom portion 19a and a peripheral wall portion 19b integrally formed with the bottom portion 19a. A conical recess 19a-1 is made in the outer surface of the bottom portion 19a at the center thereof, while a plurality of radial holes 19b-1 are made in the peripheral wall portion 19b so that the inside of the bottom member 19 communicates with the outside thereof via the radial holes 19b-1. The inner diameter of the bottom member 19 is made a little greater in the vicinity of the upper opening of the same than remaining portions, and thus the greater diameter portion of the bottom member 19 is arranged to be telescopically engaged with the above-mentioned smaller diameter portion 18b of the cylindrical spindle 18.

The third embodiment of FIGS. 5 and 6 has the following advantages. Generally speaking, since most portions of the outer surface of the spindle body 12 of FIG. 2 are in contact with the inner surface of the cylindrical bearing 14, the outer surface of the spindle body 12 is apt to wear because of friction. Therefore, it is necessary to manufacture the spindle body 12 with a material whose rigidity is very high. However, such a high rigidity material, such as hardened steel or stainless steel, is difficult to machine in a precise manner. Therefore, it would be advantageous if the spindle body 12 had a simple shape. According to the third embodiment, the spindle body 12 of FIG. 2 is replaced with the above-described combination of the cylindrical spindle 18 and the bottom member 19. Since the outer surface of the bottom member 19 is not in contact with the inner surface of the cylinder of the bearing 14, the material for the bottom member 19 is not necessarily rigid as the cylindrical spindle 18. Namely, a material which is softer than that of the cylindrical spindle 18 can be used for the bottom member 19, and therefore machining of the bottom member 19 is much easier than the case of FIG. 2. Namely, the bottom member 19 is made of a relatively soft material, such as brass or aluminum, while the cylindrical spindle 18 is made of a relatively hard material, such as hardened steel or stainless steel.

Other arrangements and operation of the third embodiment are the same as those of previous embodiments, and therefore, the description thereof is omitted.

Figure 7:
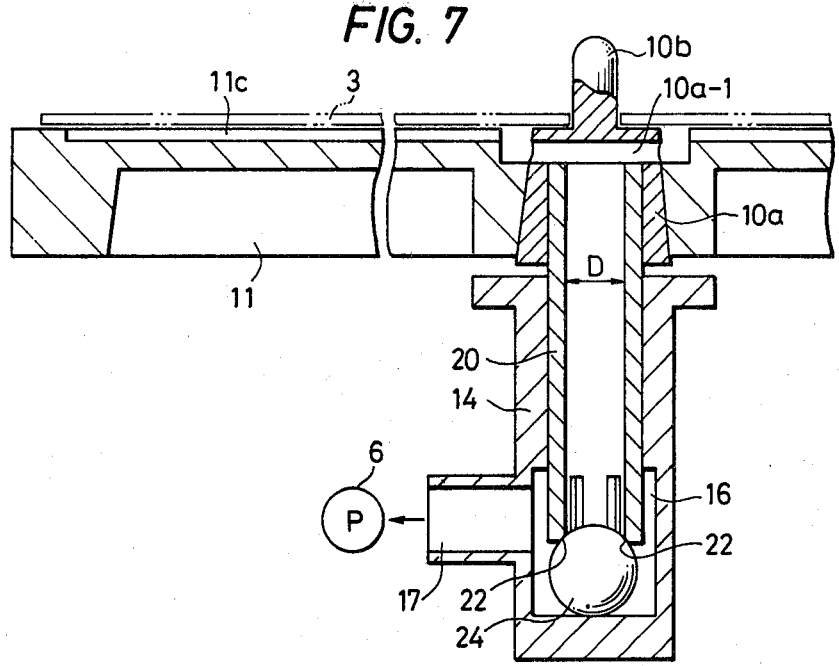
FIG. 7 is a schematic partially cross-sectional view of a fourth embodiment of the turntable system according to the present invention.
Figure 8:
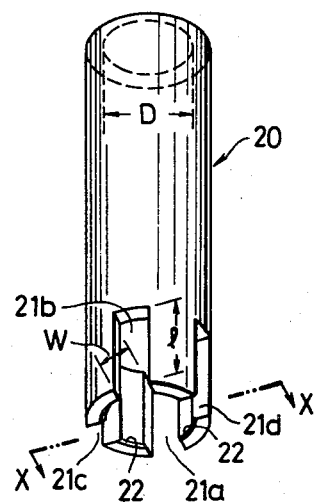
FIG. 8 is a schematic perspective view of the spindle body shown in FIG. 7.
Figure 9:
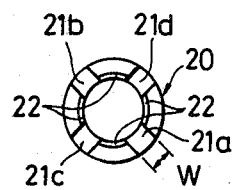
FIG. 9 is a schematic bottom plan view of the spindle body shown in FIG. 8.
Figure 10:
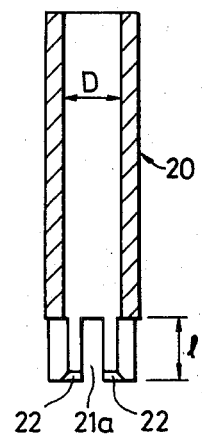
FIG. 10 is a schematic cross-sectional view of the spindle body taken along the line X—X of FIG. 8.

FIG. 7 illustrates a schematic partially cross-sectional view of a fourth embodiment of the turntable system according to the present invention. The fourth embodiment differs from the first embodiment of FIG. 2 in that the spindle body 20 which corresponds to the spindle body 12 of FIG. 2 has a specific shape at the lower portion thereof. FIG. 8 is a perspective view of the spindle body 20; FIG. 9 is a bottom view of the same; and FIG. 10 is a cross-sectional view of the same taken along a plane including line X—X of FIG. 8. As best seen in FIGS. 8 to 10, the cylindrical spindle body 20 has an open end at the bottom thereof, and a plurality of slots 21a to 21d in the vicinity of the lower open end. Each of the slots 21a to 21d is of a rectangular shape, and extends longitudinally from the lower end of the cylindrical spindle body 12 to a given length l. The width of each slots 21a to 21d is designated at W. In this embodiment, the number of the rectangular slots 21a to 21d is four, where the slots 21a to 21d are equidistantly arranged along the circumference of the bottom open end. Therefore, two opposite slots 21a and 21b can be simultaneously machined by a single machining step. The other two opposite slots 21c and 21d can be also be machined in the same way. The inner edge of the lower open end of the spindle body 20 is cut off to provide tapered portions 22. The tapered portions 22 are arranged to abut against a ball bearing 24 the diameter of which is greater than the inner diameter D of the spindle body 20. Although the tapered portions 22 are separated from each other, since the tapered portions 22 are equidistantly arranged along the circumference of the lower opening of the spindle body 20, the tapered portions 22 and the ball bearing 24 function stably as a thrust bearing.

The slots 21a to 21d function as radial passageways so that the inside of the cylindrical spindle body 20 communicates with the space in the chamber 16 in the same manner as the radial holes 12b of FIG. 2 or radial holes 19b-1 of FIG. 5. The total cross-sectional area of the radial passageways corresponds to the sum of areas of the openings of the slots 21a to 21d, and the total cross-sectional area is selected to be equal to or greater than the cross-sectional area of the longitudinal passageway of the cylindrical spindle body 20.

In the fourth embodiment of FIGS. 7 to 10, although a large diameter ball bearing 24 has to be used, machining of the spindle body 20 is very simple because only rectangular slots 21a to 21d are made in a pipe-like simply cylindrical member having open ends at both sides. Furthermore, according to the fourth embodiment the accuracy of the thrust bearing is maintained high. Namely, drill-machining for making through-holes is not required.

In order to securely attract the phonograph record 3 to the turntable body 11 so that the combination of the phonograph record and the turntable body 11 can be treated acoustically as a single element, the phonograph record 3 is attracted by a suction pressure of approximately 70 mm Aq. Assuming that the total area of one surface of a phonograph record is approximately 600 cm$^2$, the application of the above suction pressure corresponds to the placement of a weight of 4,200 grams on the record 3, namely 7 grams multiplied by 600 cm$^2$ equals 4,200 grams. Furthermore, to securely attract a phonograph record having a warp it is necessary to suck the air with a airflow rate of approximately 1,000 cc per second. When it is intended to suck the air below the phonograph record with the suction pressure of 70 mm Aq and with the flow rate of 1,000 cc/sec, the passageway between the circular recess 11b of the turntable body 11 and the suction pump 6 has to have a cross-sectional area of 50 mm$^2$. The area of 50 mm$^2$ substantially equals the area enclosed by a circle having a diameter of 8 millimeters.

Figure 21:
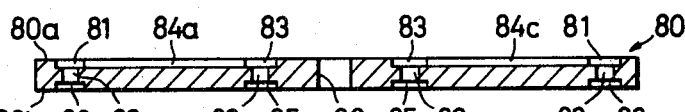
FIG. 21 is a cross-sectional view of the turntable sheet taken along the line XXI—XXI of FIG. 19.

The longitudinal passageway of the spindle body 12 of FIG. 2, therefore, has an inner diameter of 8 millimeters. In the case that the number of the upper radial passageways 10a-1 made in the top member 10 is four as shown in FIG. 3, the inner diameter of each radial passageway 10a-1 is selected to equal 4 millimeters. Of course, the number of the radial passageways 10a-1 may be increased, and the diameters of the radial passageways 10a-1 and the longitudinal passageway may be increased if desired. The other radial passageways, such as 12b of FIG. 2 19b-1 of FIG. 5, and 21 of FIG. 7, at the lower portion of the spindle body 12, bottom member 19 and the spindle 20, has a total cross-sectional area equal to or greater than 50 mm². In the same manner the conduit 7 also has a like cross-sectional area.

Now, another feature of the present invention will be described with reference to FIGS. 11 to 17 hereinbelow. FIGS. 11 to 17 respectively show fifth to eleventh embodiments of the turntable system according to the present invention, and since these embodiments relate to improvements in the structure of the lubricating system for the contact area between the ball bearing 13 interposed between the lower end of the spindle body 12, the bottom member 19 or the simply cylindric spindle 20 of the previous embodiments, and the bottom of the chamber of 16 of the cylindrical bearing 14 or between a pointed bottom end of the spindle body (see FIGS. 16 and 17) and the bottom of the chamber 16, the fifth to eleventh embodiments are shown by way of partially cross-sectional views showing mainly the structure around the bottom of the chamber 16.

Prior to describing the fifth to eleventh embodiments, the basic idea actualized by these embodiments will be described for a better understanding of the embodiments. Although it is not shown in FIGS. 2, 4, 5 and 7, a suitable lubricant is actually provided at the contact area between the ball bearing 13 and the bottom of the chamber 16 of the cylindrical bearing 14. Furthermore, a small steel plate 28 is embedded in or placed on the bottom of the chamber 16 so that the ball bearing 13 abuts against the steel plate 28. The lubricant (not shown) is attached to the upper surface of the steel plate 28 to be in contact with the ball bearing 13. However, the lubricant is directly exposed to the air in the chamber 16, and the air in the chamber 16 is continuously sucked by the vacuum pump 6 whenever the turntable system operates to play a phonograph record. As a result, the air in the chamber 16 is replaced with new air repeatedly, and thus the lubricant is exposed to new air. Therefore, the lubricant is apt to evaporate to reduce its mass, and/or is apt to oxidize to harden within a short period of time. Accordingly, the quality of the original lubricant is deteriorated resulting in malfunction of the bearing 13.

The inventor has devised means for covering a narrow space in which the lubricant is placed so that the lubricant is not exposed to the air in the chamber 16.

Figure 11:
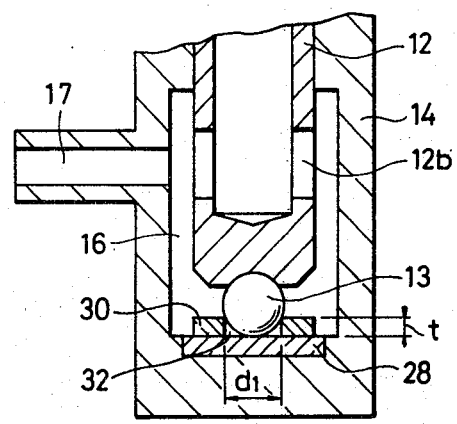
FIG. 11 is a schematic partially cross-sectional view of a fifth embodiment of the turntable system according to the present invention.

Referring to FIG. 11, an annular ring-like air-tightening member 30 is placed on the steel plate 28. The ring-like airtightening member 30 is attached to the steel plate 28 by means of a suitable adhesive prior to assembling the ball bearing 13 therewith. The ring-like air tightening member 30 has an inner diameter d1 which is a little smaller than the diameter of the ball bearing 13. In detail, the thickness "t" and the inner diameter d1 of the ring-like member 30 are respectively selected in accordance with the diameter of the ball bearing 13 so that the inner space of the ring-like airtightening member 30 is hermetically isolated from the air in the chamber 16 by the ball bearing 13 as shown in FIG. 11. Although it is shown that the ball bearing 13 is in contact with the upper inner circular edge of the airtightening member 30, it is preferable that there is a very small space between the ball bearing 13 and ring-like airtightening member 30 because the contact therebetween may apply to the ball bearing 13 undesirable friction which results in occurance of noises in the case that the airtightening member 30 is made of a hard material.

The ring-like airtightening member 30 may be made of rubber, synthetic resin, felt, metal or the like. When the ring-like airtightening member 30 is made of a hygroscopic material, such as felt, the airtightening member 30 may be arranged to absorb a lubricant in advance so that the lubricant oozes out in the space defined by the steel plate 28, the inner wall of the ring-like airtightening member 30 and the ball bearing 13.

Figure 12:
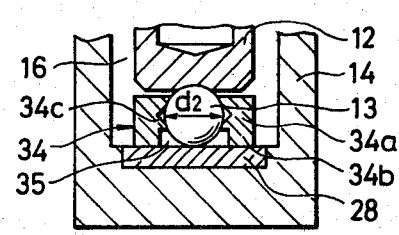
FIGS. 12 to 17 are schematic partially cross-sectional views of sixth to eleventh embodiments of the turntable system according to the present invention, which embodiments are modifications of the fifth embodiment shown in FIG. 11.
Figure 13:
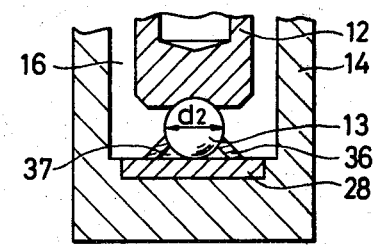

The sixth and seventh embodiments of FIGS. 12 and 13 are modifications of the fifth embodiment of FIG. 11. Namely, in FIG. 12, an airtightening member 34 has a height which is a little smaller than the diameter d2 of the ball bearing 13, and small and large inner diameter portions 34a and 34b. The small inner diameter portion 34a has a circular recess 34c along the inner surface thereof so that the axial cross-section of the small diameter portion 34a has a V-shaped cut on the inner surface. The smallest inner diameter of the small diameter portion 34a is smaller than the diameter of the ball bearing 13. The airtightening member 34 is attached to the steel plate 28 at the large diameter portion 34b, and the ball bearing 13 is supported by the inner surface of the small diameter portion 34a and the steel plate 28. When manufacturing, however, it is preferable that the ball bearing 13 is assembled with the airtightening member 34 in advance so that the combination of the ball bearing 13 and the airtightening member 34 is simply and readily mounted on the steel plate 28. Therefore, it is easy to handle the ball bearing 13 because the ball bearing 13 does not move around on the steel plate 28 when assembling.

The airtightening member 34 is made of an elastic material such as rubber, and therefore, it is possible to place the ball bearing 13 in the space surrounded by the small diameter portion 34a. The lubricant is located in the space 35 defined by the steel plate 28, the airtightening member 34 and the ball bearing 13 in the same manner as in the fifth embodiment.

FIG. 13 shows the seventh embodiment which corresponds to another modification of the fifth embodiment of FIG. 11. In the seventh embodiment, a hollow truncated conical airtightening member 36 is employed. The airtightening member 36 is attached, at its bottom, to the steel plate 28. The airtightening member 36 has an upper opening the inner diameter of which is smaller than the diameter d1 of the ball bearing 13. The ball bearing 13 is partially received in the hollow truncated cone of the airtightening member 36 where the bottom of the ball bearing 13 is in contact with the steel plate 28. The lubricant is located in the space 37 defined by the steel plate 28, the airtightening member 26 and the ball bearing 13. In this embodiment, the hollow truncated conical airtightening member 36, is first attached to the steel plate 28 before the ball bearing 13 is placed. Accordingly, the ball bearing 13 does not move around when assembling.

Figure 14:
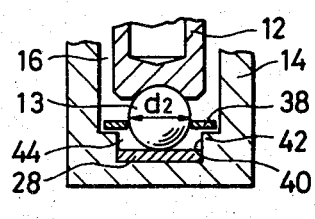

Referring to FIG. 14, an eighth embodiment of the present invention will be described. In the eighth embodiment, the bottom of the chamber 16 of the cylindrical bearing 14 has a circular recess 40 at the center thereof. Namely, as shown in FIG. 14, the center of the bottom of the chamber 16 is deeper than the remaining portion, and the steel plate 28 is received in the circular recess 40. An annular airtightening member 38 made of a thin plate is attached to a shallow bottom portion, i.e. the shoulder portion 42 of the center recess 40 so as to surround the ball bearing 13. The lubricant is placed in the space 44 defined by the steel plate 28, the side wall of the recess 40, the annular airtightening member 38 and the ball bearing 13.

Figure 15:
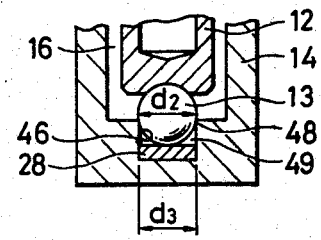

FIG. 15 shows a ninth embodiment of the present invention. The ninth embodiment is similar to the eighth embodiment of FIG. 14 because the steel plate 28 is received in a circular recess 46 made at the center of the bottom of the chamber 16 of the cylindrical bearing 14. However, in the ninth embodiment, no airtightening member is additionally provided because the inner wall of the circular recess 46 functions as means for airtightening In detail, the inner diameter d3 of the circular recess 46 is a little smaller than the diameter d2 of the ball bearing 13, and the depth of the recess 46 and the thickness of the steel plate 28 are respectively so selected that the shoulder 48 of the circular recess is very close to the ball bearing 13. As a result, the space 49 defined by the steel plate 28, the inner wall of the recess 46 and the ball bearing 13 is substantially hermetic, and therefore, the lubricant placed in the space 49 is not directly exposed to the moving air in the chamber 16.

Figure 16:
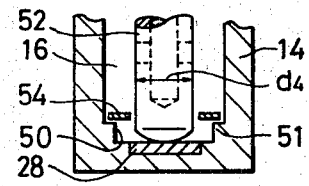

FIG. 16 shows a tenth embodiment which is similar to the eighth embodiment of FIG. 14 because a circular recess 50 is made at the bottom of the chamber 16 of the cylindrical bearing 14, while a ring-like thin airtightening plate 54 is placed on the shoulder 51 of the recess 50. However, the tenth embodiment differs from previous embodiments in that no ball bearing is employed. Namely, as shown in FIG. 16, the bottom of the spindle body 52 is made semi-spherical so that only a pointed portion at the very end abuts against the steel plate 28. A longitudinal passageway and radial passageways, which are made in the spindle body 52, are respectively illustrated by broken lines. The circular recess 50 has an inner diameter which is greater than the outer diameter d4 of the spindle body 52, while the inner diameter of the ring-like thin airtightening member 54 is a little greater than the outer diameter d4 of the spindle body 52. However, if the airtightening member 54 is made of a soft material, such as felt, these diameters may be equal to each other so that the airtightening member 54 is in contact with the periphery of the spindle body 52.

Figure 17:
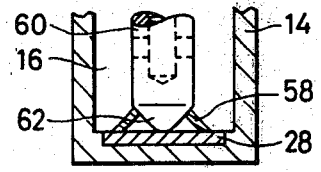

FIG. 17 shows an eleventh embodiment which is another modification. In this embodiment, no circular recess is made on the bottom of the chamber 16 of the cylindrical bearing 14, and a hollow truncated conical airtightening member 58 is used in the same manner as in FIG. 13. However, the arrangement of FIG. 17 does not comprise a ball bearing because the lower end 62 of the spindle body 60 is shaped to have a conical shape. The summit of the cone, i.e. the very end of the spindle body 60, is made semi-spherical. The hollow truncated conical airtightening member 58 is arranged to abut against the periphery of the cone of the lower end 62 of the spindle body 60 when the airtightening member 58 is made of a soft material, and on the other hand, the airtightening member 58 is arranged to be spaced by a short distance from the lower end 62 when the airtightening member 58 is made of a metal or the like.

As will be understood from the description of the fifth to elventh embodiments of FIGS. 11 to 17, the air around the lubricant placed at the bottom of the chamber 16 of the cylindrical bearing 14 is substantially isolated from the air in the chamber 16. Therefore, the lubricant is not exposed to moving air, and thus the quality of the lubricant can be maintained even though the air in the chamber 16 is continuously sucked by the vacuum pump 6.

Now another feature of the present invention will be described with reference to FIGS. 18 to 26. As described hereinbefore in connection with FIG. 2, it is assumed that the phonograph record 3 is directly placed on the turntable body 11. In other words, in the above-described previous embodiments, no turntable sheet or pad is employed. However, if desired, a turntable sheet may be used providing various advantages. Namely, when a suitable turntable sheet is used, no grooves have to be made on the upper surface of the turntable body 11. Moreover, since the phonograph record 3 is placed on the turntable sheet, the upper surface of the turntable body 11 does not have to be very smooth when manufacturing the same.

The inventor of the present invention invented a turntable system, in which a phonograph record is attracted to a turntable sheet placed on the turntable body, prior to the present invention. The turntable system having a turntable sheet was disclosed in a Japanese patent application No. 53-32933 (corresponding U.S. application Ser. No. 22,515 which was patented as U.S. Pat. No. 4,234,195 with the title of "APPARATUSES FOR REPRODUCING SIGNALS FROM ROTARY RECORDING MEDIUMS") For a better understanding of the features of the present invention, relating to the turntable sheet, the already disclosed turntable sheet will be described with reference to FIG. 18 hereinbelow.

Figure 18:
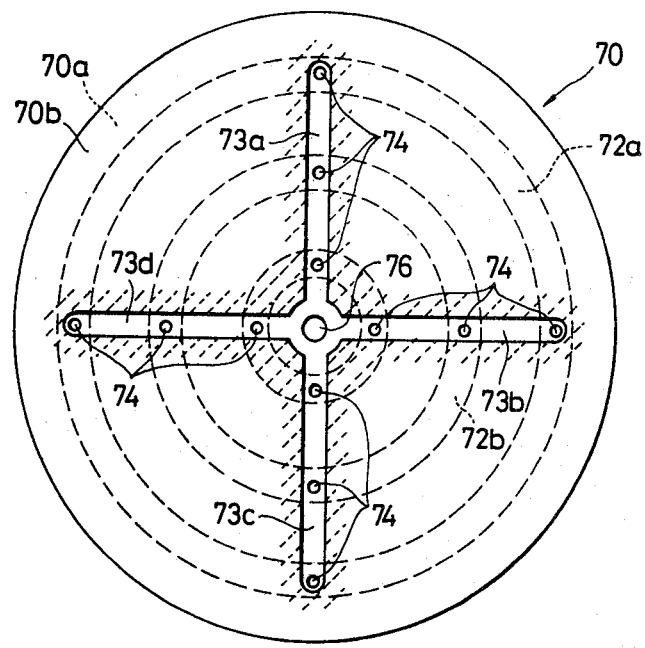
FIG. 18 is a schematic bottom plan view of a turntable sheet already disclosed in a prior application of the present inventor.

FIG. 18 shows the bottom of a turntable sheet which was disclosed in the above-mentioned prior application. A turntable sheet proper is designated at a reference numeral 70, and the upper and lower surfaces thereof are respectively designated at numerals 70a and 70b. A plurality of circular recesses or grooves 72a, 72b and 72c are made in the upper surface 70a to be coaxial with each other. A plurality of radial recesse or grooves 73a, 73b, 73c and 73d are made in the lower surface 70b in a crossed manner, simulating an X. The center of the X of the grooves 73a to 73d is arranged to correspond to the center of the coaxial circular grooves 72a to 72c on the opposite side. A plurality of through-holes 74 are made so that the circular grooves 72a to 72c on the upper surface 70a communicate with the radial grooves 73a to 73d on the lower surface 70b. At the center of the turntable sheet 70 is made a through-hole 76 to be engaged with the projection of the center spindle of the turntable body having no radial grooves on the upper surface thereof.

The turntable sheet 70 of FIG. 18 is placed on such a turntable body, and thus the air in the grooves 72a to 72c and 73a to 73d is sucked by the vacuum force from the pump with a phonograph record placed on the upper surface of the turntable sheet 70. Although the phonograph record is effectively attracted by the vacuum force throughout the entire area thereof because of the grooves 72a are circular, the turntable sheet 70 per se is attracted to the turntable body at only a small area. Namely, since the grooves 73a to 73d are made in only radial directions on the lower surface 70b, and since there are no circular grooves, the turntable sheet 70 is attracted to the turntable body at only the hatched portions. As a result, the degree of acoustic cross modulation, howling and vibration cross modulation caused by the vibration of the phonograph record which occur as a reaction of the reproducing stylus, cannot be sufficiently suppressed.

Figure 19:
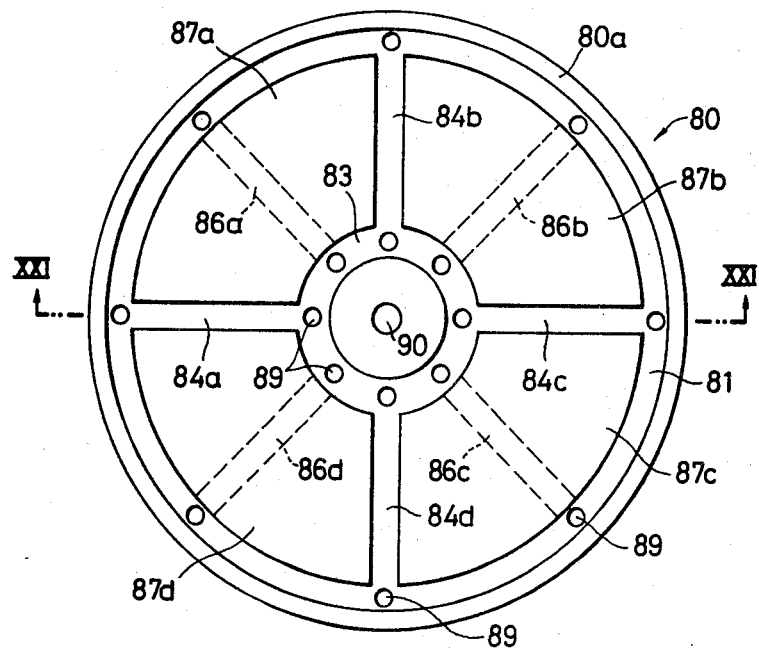
FIGS. 19 and 20 are respectively top and bottom plan views of a turntable sheet which may be used with the turntable system according to the present invention.
Figure 20:
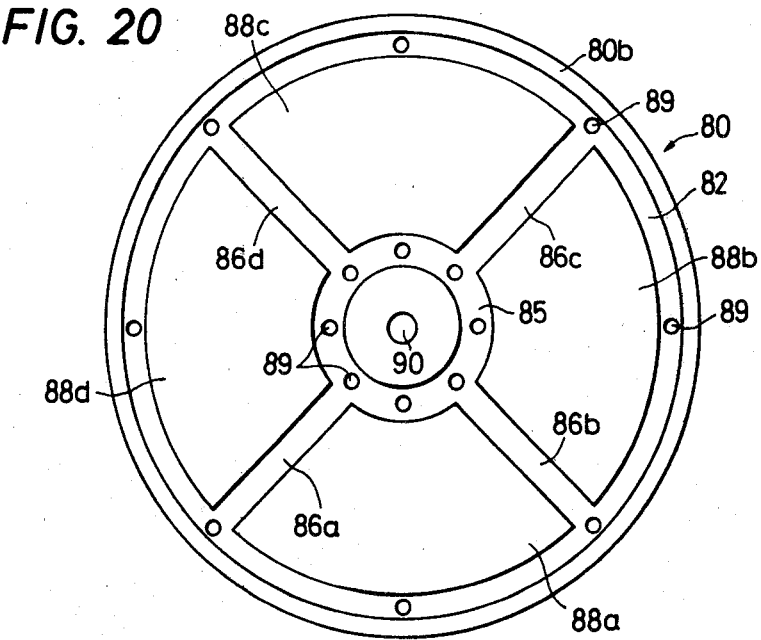

The inventor, therefore, has invented a new turntable sheet which does not suffer from the above disadvantage. FIGS. 19 and 20 respectively show the top plan view and the bottom plan view of the turntable sheet which can be used in the turntable system according to the present invention. A turntable sheet proper is designated at a numeral 80, and comprises two coaxial circular grooves or recesses 81 and 83 and four radial grooves or recesses 84a, 84b, 84c and 84d on the upper surface 80a thereof. In detail, the radial grooves 84a to 84d respectively extend outwardly from the inner circular groove 83 to the outer circular groove 81, and all grooves 81, 83 and 84a to 84d communicate with each other.

On the lower surface 80b of the turntable sheet 80 made are two coaxial circular 85 and 82 and four radial grooves 86a, 86b, 86c and 86d. These grooves 85, 82 and 86a to 86d are arranged in the same manner as the grooves 83, 81 and 84a to 84d on the upper surface 80a. The radial grooves 86a to 86d on the lower surface 80b, however, are arranged to be located between radial grooves 84a to 84d on the upper surface 80a as shown in FIG. 19. A plurality of through-holes 89 are made in the circular grooves 83, 81 85 and 82 so that the circular recesses 83 and 81 on the upper surface 80a communicate with the circular recesses 85 and 82 on the lower surface 80b. A center hole 90 is made through the turntable sheet 80 at the center thereof so that the center hole 90 engages with the projection of the spindle of the turntable body when placed on the turntable body.

Figure 22:
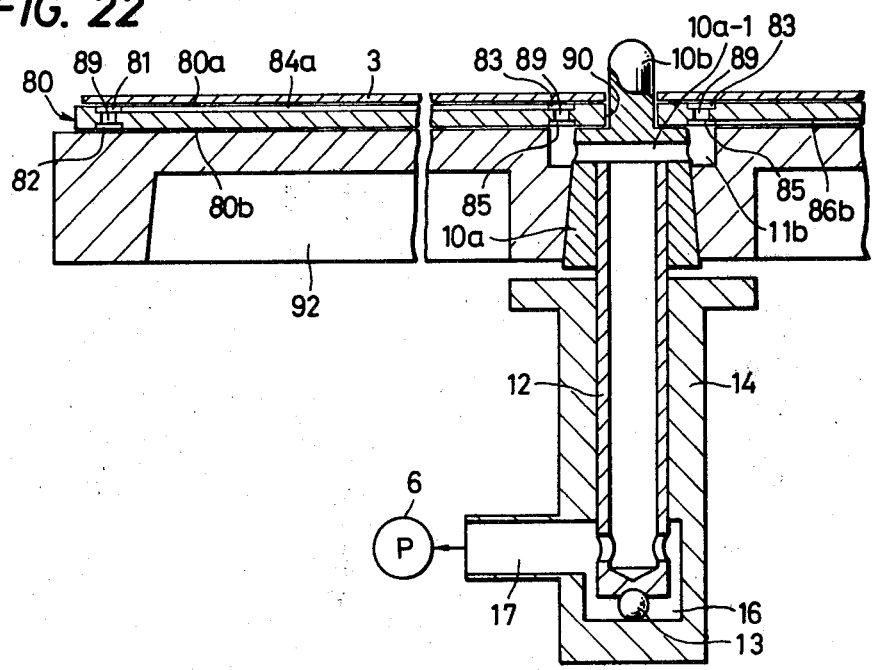
FIG. 22 is a schematic partially cross-sectional view of a turntable system having the turntable sheet shown in FIGS. 19 to 21.

With this arrangement, four sectors or fan-shaped portions 87a, 87b, 87c and 87d are formed on the upper surface 80a, while four sectors or fan-shaped portions 88a, 88b, 88c are formed on the lower surface 80b. The turntable sheet 80 is shown by way of a cross-sectional view in FIG. 21. FIG. 22 illustrates a turntable system having the above-described turntable sheet 80. As described hereinbefore, since grooves are made on the lower surface 80b of the turntable sheet 80, it is unnecessary to make radial and circular grooves on the upper surface of the turntable body 92. Other arrangements of the turntable system of FIG. 22 are the same as in FIG. 2, and therefore description thereof is omitted.

The attracting operation with the turntable sheet 80 of FIG. 22 is performed as follows. A phonograph record 3 is first placed on the turntable sheet 80, and the vacuum pump 6 starts operating. As soon as the pump 6 sucks air, air in the grooves 83, 81, 84a to 84d, 85, 82, 86a to 86d is lead through the circular recess 11b, the upper radial passageways 10a–l and longitudinal passageway both made in the spindle assembly, the chamber 16 and the conduit 17 to the vacuum pump 6 to be exhausted outside. As the air in the grooves 83, 81, 84a to 84d, 85, 82, 86a to 86d is evacuated, the pressure in the grooves reduces generating vacuum attracting force in the vicinity of the grooves. Accordingly, the turntable sheet 80 is first attracted to the upper surface of the turntable body 92 in the vicinity of the lower grooves 85, 82 to 86a to 86d. Simultaneously, the phonograph record 3 is first attracted to the upper surface of the turntable sheet 80 in the vicinity of the upper grooves 83, 81 and 84a to 84d. Immediately after the above attraction, the air on respective sectors 88a to 88d, each of which is enclosed by two arcs of the circular grooves 85 and 82, and by two adjacent radial grooves 86a to 86d is evacuated lowering the pressure thereof. As a result the sectors 88a to 88d are attracted to the upper surface of the turntable body 92. Thus, the entire lower surface 80b of the turntable sheet is attracted to the turntable body 92. In the same manner the entire phonograph record 3 is attracted to the upper surface of the turntable sheet 80. Therefore, the phonograph record 3 and the turntable sheet 80 are fixedly supported indirectly and directly on the turntable body 92 by a sufficient force. As a result, the degrees of acoustic cross modulation, howling, and vibration cross modulation caused by vibrations of the phonograph record 3 as a reaction of reproducing stylus (not shown) are respectively decreased.

Although in the above-described embodiment, the radial grooves 86a to 86d of the lower surface 80b of the turntable sheet 80 are arranged to be located between the radial grooves 84a to 84d of the upper surface 80, these radial grooves on both sides may be made at the corresponding positions on the upper and lower surfaces 80a and 80b. In other words, the groove patterns of the both sides of the turntable sheet 80 may be arranged symmetrical with respect to a radial plane passing through the center of the turntable sheet 80. The numbers of grooves, and through-holes may be changed if desired. In addition, the circular grooves are not necessarily of complete circular shape. Namely, a plurality of arc-like grooves each communicating with the radial groove or grooves may be made in place of such circular grooves.

Reference is now made to FIGS. 23 to 27 which show a further embodiment of the present invention. The feature of this embodiment is to provide a turntable system having a turntable sheet which can be used for phonograph records of two different sizes. Turning back to FIGS. 19 to 22, since the diameters of the outer circular grooves 81 and 82 on both sides of the turntable sheet 80 are equal to each other and are fixed, the turntable sheet 80 can be used for phonograph records having a given diameter, such as 30 centimeters or 17 centimeters. Therefore, when it is intended to play a record of different size, the turntable sheet 80 of FIGS. 19 to 22 has to be replaced with one having a given diameter of outer circular grooves.

Figure 23:
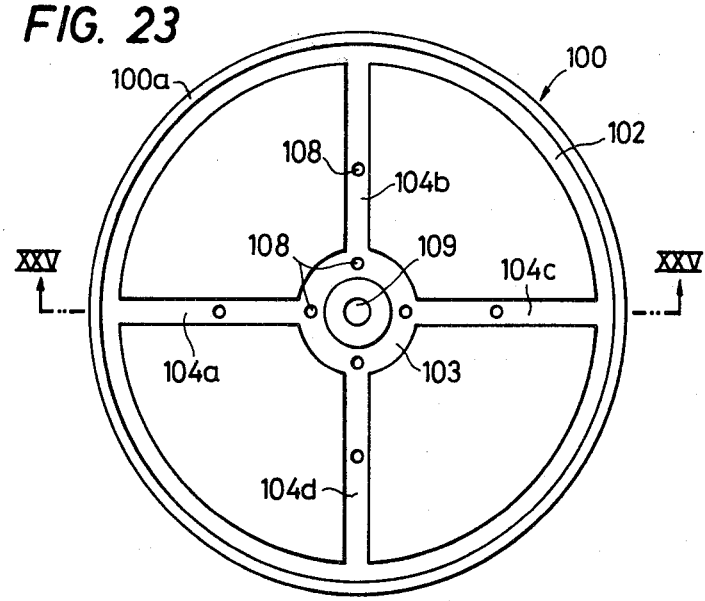
FIGS. 23 and 24 are respectively top and bottom plan views of another turntable sheet, which is a modification of the turntable sheet of FIGS. 19 to 22.
Figure 24:
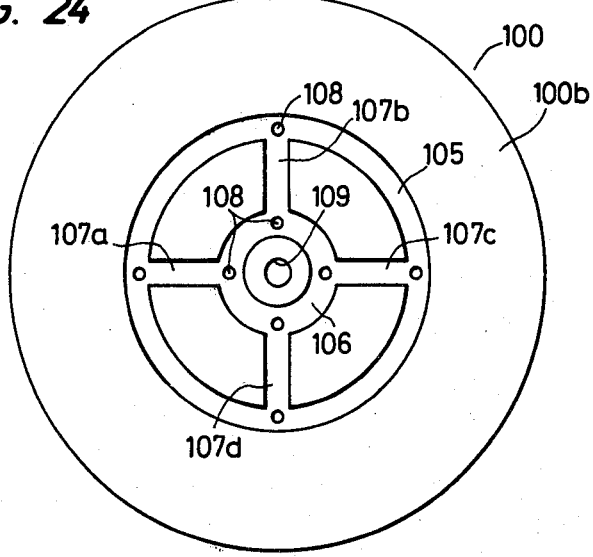
Figure 25:
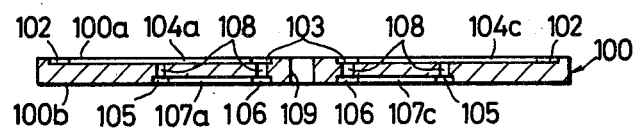
FIG. 25 is a cross-sectional view of the turntable sheet taken along the line XXV—XXV of FIG. 23.

The inventor of the present invention has invented a new turntable sheet which can be adapted to two sizes of phonograph records. FIG. 23 illustrates a top plan view of the turntable sheet, and the buttom plan view is shown in FIG. 24. FIG. 25 is a cross sectional view taken along XX V—XX V of FIG. 23. The turntable sheet is designated at a reference numeral 100, and has two circular grooves 102 and 103 on the upper surface 100a thereof in the same manner as in the above-described embodiment. The diameter of the outer circular groove 102 is a little smaller than the diameter of the turntable sheet 100, and the inner and outer circular grooves 102 and 103 are connected by four radial grooves 104a, 104b, 104c and 104d. In detail, the outer diameter of the outer circular groove 102 is a little less than 30 centimeters.

On the other hand, although the lower surface 100b of the turntable sheet 100 has two circular grooves 105 and 106, and four radial grooves 107a and 107d, the outer diameter of the outer circular groove 105 is a little less than 17 centimeters, and the radial grooves 107a to 107d do not extend beyond the outer circular groove 105. As a result, the peripheral remaining portion surrounding the outer circular groove 105 is flat.

A plurality of through-holes 108 are made in the circular grooves 105 and 106 of the lower surface 100b so that the inner circular grooves 103 and 106 of the both sides communicate with each other, and the outer circular groove 105 of the lower surface 100b communicates with radial grooves 104a to 104d on the upper surface 100a. In other words, both the radial grooves 104a to 104d on the upper surface 100a and the radial grooves 107d on the lower surface 100b are arranged in X-fashion, where the two X-fashioned patterns are located at the same position in the rotating direction of the turntable sheet 100.

Figure 26:
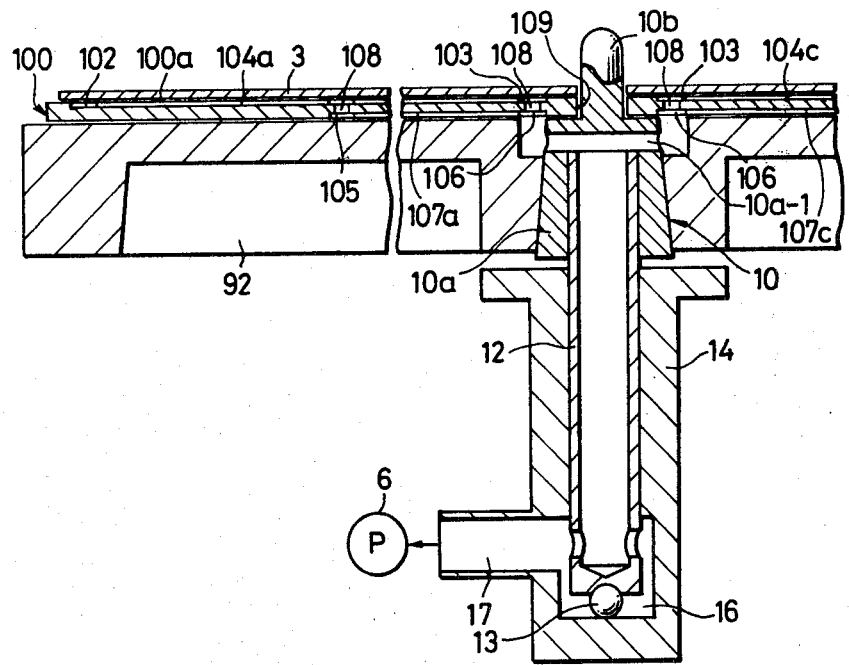
FIGS. 26 and 27 are respectively schematic cross-sectional views of a turntable system showing the usage of the turntable sheet shown in FIGS. 23 to 25.

The turntable sheet 100 has a center hole 109 in the same manner as the turntable sheet 80 of FIGS. 19 to 22. The turntable sheet 100 will be used in the following manner. When it is intended to play a phonograph record having a diameter of 30 centimeters, the turntable sheet 100 is placed on the upper surface of the turntable body 92 in such a direction that the lower surface 100b of the turntable sheet 100 abuts against the turntable body 92 as shown in FIG. 26. Accordingly, a phonograph record 3 is placed on the upper surface 100a of the turntable sheet 100. Since the diameter of 30-centimeter-record is greater than the outer diameter of the outer circular groove 102 on the upper surface 102, all of the grooves 102, 103 and 104a to 104d are covered by the phonograph record 3. As the vacuum pump 6 operates, the air in all of the grooves 102, 103, 104a to 104d, 105, 106 and 107a to 107d on the upper and lower surfaces 100a and 100b of the turntable sheet 100 is evacuated attracting the turntable sheet 100 to the turntable body 92, and the phonograph record 3 to the turntable sheet 100. Therefore, substantially the entire area of the phonograph record 3 is attracted to the turntable sheet 100, while the turntable sheet 100 is attracted at an annular area defined between inner and outer circular grooves 106 and 105 on the lower surface 100b.

Figure 27:
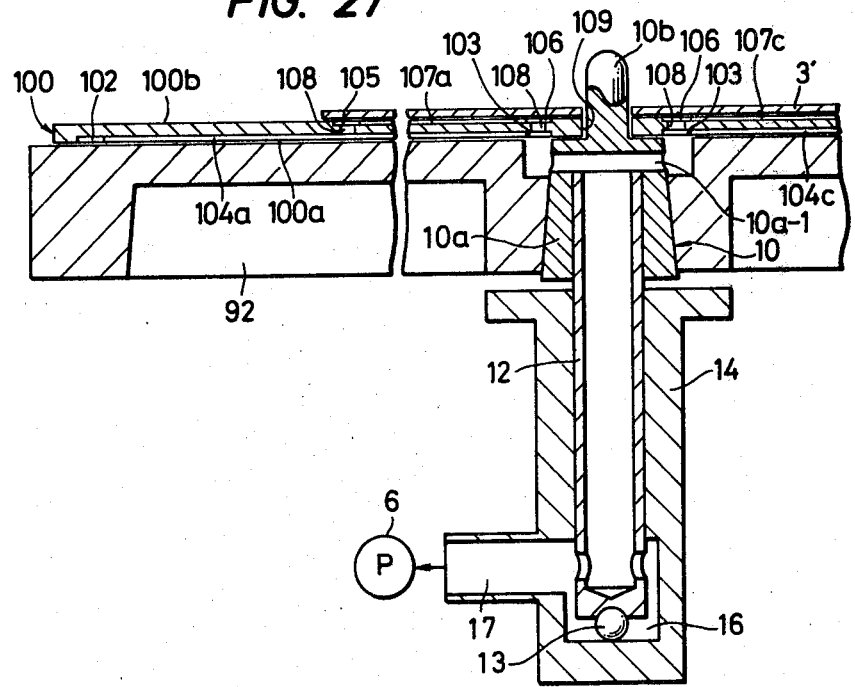

When it is intended to play a phonograph record having a diameter of 17 centimeters, the turntable sheet 100 is turned upside down as shown in FIG. 27. Namely, the upper surface 100a is in contact with the upper surface of the turntable body 92, and then a 17-centimeter-record 3' is placed on the lower surface 100b. Therefore, the grooves 105, 106 and 107a to 107d on the lower surface 100b is completely covered by the 17-centimeter-record 3'. The air in all the grooves 105, 106, 107a to 107d, 102, 103, 104a to 104d is evacuated as the vacuum pump 6 operates attracting the entire turntable sheet to the turntable body 92, and attracting the phonograph record 3' to the turntable sheet 100.

The number of the circular and radial grooves and the through-holes may be changed if desired. Although in the above-described embodiment, the turntable sheet 100 is suitable for playing 30-centimeter-records and 17-centimeter-record, the diameter of the outer circular grooves 103 and 106 may be changed so that the turntable sheet is suitable for other size records, such as of 25 centimeters. The turntable sheet 80 or 100 of the above-described embodiments may be made of rubber, a synthetic resin, a metal glass or the like.

Although FIGS. 22 and 27 correspond to the embodiment of FIG. 2 in connection with the structure of the spindle assembly, the turntable sheet 80 or 100 described in the above may be adapted to any of the previously described embodiments. The above-described embodiments of the present invention are just examples, and therefore, it will be apparent for those skilled in the art that many modifications and variations may be made without departing from the spirit of the present invention.

What is claimed is:

1. A turntable system for a record player of the type arranged to attract a phonograph record by a vacuum force, comprising:
   (a) a turntable body rotatably mounted and arranged to be driven;
   (b) a multiple-part spindle rotatably mounted on a stationary member for supporting said turntable, said spindle having
      (i) a generally cylindrical spindle body, and
      (ii) a top member having a projection at the top thereof and a turntable mount integrally formed with said projection,
      (iii) said projection being provided to be fitted in a center hole of a phonograph record when the phonograph record is placed on said turntable,
      (iv) said turntable mount having a hollow bore therein for receiving a top portion of said cylindrical spindle body, said turntable mount having an outer diameter which is greater than that of said projection,
      (v) a plurality of passageways being made in said turntable mount in substantially radial directions,
      (vi) said cylindrical spindle body having an open end at its one end, and
      (vii) a longitudinal passageway communicating, at said open end, with said plurality of radial passageways of said top member;
   (c) a hollow cylindrical bearing for partially receiving said spindle body,
      (i) said bearing having a chamber which is communicable with said longitudinal passageway of said spindle body via openings made in the vicinity of the other end of said spindle body,
      (ii) said turntable body having a recess around its center hole which is telescopically engaged with the outer surface of said turntable mount, said recess having a predetermined depth so that the space defined by said recess communicates with said plurality of radial passageways of said turntable mount; and
   (d) means for producing vacuum, said means communicating via said chamber, said openings of said spindle body, said longitudinal passageway and said radial passageways with said recess of said turntable body so that said phonograph record and/or a turntable sheet placed on said turntable body can be attracted toward said turntable body when said means is operated.

2. A turntable system as claimed in claim 1, characterized in that said turntable mount is of truncated conical shape, and in that said center hole of said turntable body is so shaped to be engaged with the periphery of said turntable mount.

3. A turntable system as claimed in claim 1, characterized in that said turntable mount has small and large diameter portions and a stepped portion between said small and large diameter portions, and in that said small diameter portion is fitted in said center hole of said turntable body so that the bottom periphery of said center hole is placed on said stepped portion.

4. A turntable system as claimed in claim 1, characterized in that said cylindrical spindle body comprises a closed end at the bottom thereof.

5. A turntable system as claimed in claim 1, characterized in that said cylindrical spindle body comprises a cylindrical body having an open end at the bottom thereof, and a bottom member telescopically engaged with the bottom of said cylindrical body, said bottom member having a closed bottom end.

6. A turntable system as claimed in claim 5, characterized in that said bottom member is made of a material which is softer than that of said cylindrical body.

7. A turntable system as claimed in claim 4, characterized in that said openings in the vicinity of said other end of said cylindrical spindle body comprise a plurality of passageways extending in substantially radial directions.

8. A turntable system as claimed in claim 5, characterized in that said opening in the vicinity of said other end of said cylindrical spindle body comprises a plurality of substantially radial passageways formed in said bottom member.

9. A turntable system as claimed in claim 4, characterized in that said spindle body comprises a conical recess formed at the center of said closed end thereof for partially receiving a ball bearing placed on the bottom of said chamber of said cylindrical bearing.

10. A turntable system as claimed in claim 4, characterized in that said spindle body comprises a semi-spherical recess formed at the center of said closed end thereof for partially receiving a ball bearing placed on the bottom of said chamber of said cylindrical bearing.

11. A turntable system as claimed in claim 5, characterized in that said bottom member comprises a conical recess formed at the center of said closed end thereof for partially receiving a ball bearing placed on the bottom of said chamber of said cylindrical bearing.

12. A turntable system as claimed in claim 5, characterized in that said bottom member comprises a semi-spherical recess formed at the center of said closed end for partially receiving a ball bearing placed on the bottom of said chamber of said cylindrical bearing.

13. A turntable system as claimed in claim 1, characterized in that said spindle body comprises a simply cylindrical member having an open end at the bottom thereof, and in that a ball bearing having a diameter which is greater than the inner diameter of said cylindrical member is interposed between said bottom open end and the bottom of said chamber of said cylindrical bearing.

14. A turntable system as claimed in claim 13, characterized in that the inner edge of said bottom open end of said cylindrical member is tapered, and in that said ball bearing is arranged to abut against said tapered portion.

15. A turntable system as claimed in claim 13, characterized in that a plurality of rectangular slots extending longitudinally from said bottom open end to a given length are made.

16. A turntable system as claimed in claim 15, characterized in that said plurality of rectangular slots are equidistantly arranged along the circumference of said bottom open end.

17. A turntable system as claimed in claim 4, characterized in that said closed end is of a semi-spherical shape, and in that said semi-spherical closed end abuts, at its center point, against the bottom of said chamber of said cylindrical bearing.

18. A turntable system as claimed in claim 4, characterized in that said closed end is of a generally conical shape and has a semi-spherical portion at the apex of the cone, and in that said semi-spherical portion abuts, at its center point, against the bottom of said chamber of said cylindrical bearing.

19. A turntable system as claimed in claim 1, characterized in that a plate is placed on the bottom of said chamber of said cylindrical bearing.

20. A turntable system as claimed in claim 19, characterized by means for airtightening placed in the vicinity of the bottom of said chamber of said cylindrical bearing, a lubricant placed on said plate being isolated from the air in said chamber of said cylindrical bearing.

21. A turntable system as claimed in claim 20, characterized in that said airtightening means comprises a ring-like member having an inner diameter which is smaller than that of a ball bearing placed on said plate.

22. A turntable system as claimed in claim 21, characterized in that said ring-like member has a height so that said ring-like member is spaced form said ball bearing by a short distance.

23. A turntable system as claimed in claim 21, characterized in that said ring-like member is made of a hygroscopic material for including a lubricant therein.

24. A turntable system as claimed in claim 20, characterized in that said airtightening means has a height which is a little smaller than the diameter of a ball bearing placed on said steel plate, and large and small inner diameter portions, said ball bearing being partially received in said small diameter portion.

25. A turntable system as claimed in claim 24, characterized in that said small diameter portion includes a circular recess formed along the inner surface thereof.

26. A turntable system as claimed in claim 25, characterized in that said circular recess has a V-shaped cross-section.

27. A turntable system as claimed in claim 20, characterized in that said airtightening means is of a hollow truncated conical shape, and has an open end at its top for partially receiving a ball bearing placed on said plate.

28. A turntable system as claimed in claim 27, characterized in that the diameter of said open end of said hollow truncated cone and the height of said hollow truncated cone are respectively selected so that said open end is spaced from said ball bearing by a short distance.

29. A turntable system as claimed in claim 20, characterized in that said cylindrical bearing includes a recess formed in the bottom thereof, and in that said airtightening means is placed on a shoulder of said recess to surround a ball bearing placed on said plate which is placed in said recess.

30. A turntable system as claimed in claim 29, characterized in that said airtightening means comprises a thin annular plate.

31. A turntable system as claimed in claim 30, characterized in that said thin annular plate has an inner diameter which is a little smaller than the diameter of said ball bearing.

32. A turntable system as claimed in claim 20, characterized in that said chamber of said cylindrical bearing comprises a recess formed in the bottom thereof, and in that said airtightening means is placed on the shoulder of said recess to surround the periphery of said spindle body having a pointed portion at the center of the bottom end thereof placed on said plate.

33. A turntable system as claimed in claim 20, characterized in that said airtightening means comprises a hollow truncated conical shape, and having an open end at its top for receiving the bottom end of said spindle body having a pointed portion at the center of said bottom end placed on said plate.

34. A turntable system as claimed in claim 33, characterized in that the diameter of said open end of said hollow truncated cone and the height of said hollow cone are respectively selected so that said open end is spaced from said spindle body by a short distance.

35. A turntable system as claimed in claim 19, characterized in that the bottom of said chamber of said cylindrical bearing comprises a recess formed therein, said plate being received in the bottom of said recess, and in that the diameter and the depth of said recess are respectively selected so that the air in said recess is substantially tightened by a ball bearing placed on said steel plate.

36. A turntable system as claimed in claim 1, characterized in that the upper surface of said turntable body comprises a plurality of radial and circular grooves, said grooves communicating with each other and with said recess of said turntable body.

37. A turntable system as claimed in claim 1, characterized by a turntable sheet placed on the upper surface of said turntable body, said turntable sheet having a plurality of radial and circular grooves on both sides thereof, said grooves on both sides communicating with each other via through-holes in said turntable sheet.

38. A turntable system as claimed in claim 1, characterized by a turntable sheet placed on the upper surface of said turntable body, said turntable sheet having a plurality of radial and arc-like grooves on both sides thereof, said grooves on both sides communicating with each other via through-holes in said turntable sheet.

39. A turntable system as claimed in claim 37 or 38, characterized in that said radial grooves on both sides are respectively arranged in an X-fashion.

40. A turntable system as claimed in claim 37 or 38, characterized in that each of said radial grooves on one surface of said turntable sheet is arranged between two adjacent radial grooves on the other surface.

41. A turntable system as claimed in claim 37 or 38, characterized in that said through-holes are made in said circular or arc-like grooves, respectively.

42. A turntable system as claimed in claim 37 or 38, characterized in that the upper surface of said turntable body is flat except for said recess located around said center hole thereof.

43. A turntable system as claimed in claim 37 or 38, characterized in that the largest diameter of said circular or arc-like grooves on one side of said turntable sheet is a little smaller than a first phonograph record size, and in that the largest diameter of said circular or arc-like grooves on the other side is a little smaller than a second, different phonograph record size.

44. A turntable system as claimed in claim 43, characterized in that some of said through-holes are made between said radial grooves on said one side and at least one circular groove or arc-like grooves on said other side.

45. A turntable system as claimed in claim 19 wherein said plate is formed of steel.

46. A turntable system for a record player of the type arranged to attract a phonograph record by a vacuum force, comprising:
(a) a turntable body rotatably mounted and arranged to be driven;
(b) a multiple-part spindle rotatably mounted on a stationary member for supporting said turntable, said spindle having
  (i) a generally cylindrical spindle body, and
  (ii) a top member having a projection at the top thereof and a turntable mount integrally formed with said projection,
  (iii) said projection being provided to be fitted in a center hole of a phonograph record when the phonograph record is placed on said turntable,
  (iv) said turntable mount having a hollow bore therein for receiving a top portion of said cylindrical spindle body,
  (v) said turntable mount having an outer diameter which is greater than that of said projection,
  (vi) a plurality of passageways being made in said turntable mount in substantially radial directions,
  (vii) said cylindrical spindle body having an open end at its one end, a longitudinal passageway communicating, at said open end, with said plurality of radial passageways of said top member, and a closed end at the other end,
(c) a hollow cylindrical bearing for partially receiving said spindle body, said bearing having a chamber which is communicable with said longitudinal passageway of said spindle body via openings made in the vicinity of said closed end of said spindle body;
said turntable body having a recess around its center hole which is telescopically engaged with the outer surface of said turntable mount, said recess having a given depth so that the space defined by said recess communicates with said plurality of radial passageways of said turntable mount; and
(d) means for producing vacuum, said means communicating via said chamber, said openings of said spindle body, said longitudinal passageway and said radial passageways with said recess of said turntable body so that said phonograph record and/or a turntable sheet placed on said turntable body can be attracted toward said turntable body when said means is operated.

47. A turntable system as claimed in claim 46, characterized in that said spindle body comprises a simply cylindrical member and a bottom member telescopically engaged with said simply cylindrical member, said bottom member being made of a material which is softer than that of said simply cylindrical member.

48. A turntable system as claimed in claim 46, characterized in that a ball bearing is interposed between the outer surface of said closed end of said cylindrical spindle body and the bottom of said chamber of said cylindrical bearing, and in that a recess for partially receiving said ball bearing is provided on said outer surface of said closed end of said cylindrical spindle body.

49. A turntable system as claimed in claim 46, characterized in that said outer surface of said closed end of said cylindrical spindle body comprises a pointed portion at the center thereof, which is arranged to abut against the bottom of said chamber of said cylindrical bearing.

50. A turntable sheet for use with a turntable system of the type arranged to attract a phonograph record placed via said turntable sheet on a turntable body to said turntable body by a vacuum force applied through a passageway made in said turntable body, where said passageway is made in the vicinity of the center of said turntable body, characterized in that said turntable sheet includes means on one side thereof for attracting a phonograph record of a first predetermined size, and means on the other side thereof for attracting a phonograph record of a second, different, predetermined size comprising:
on one side of said turntable sheet, an inner circular or arcuate groove, an outer circular or arcuate groove, and a plurality of radial grooves interposed between said inner and outer grooves;

on the other side of said turntable sheet, an inner circular or arcuate groove, an outer circular or arcuate groove, and a plurality of radial grooves interposed between said inner and outer grooves;

said outer groove of said one side having a diameter which is smaller than that of said outer groove of said other side, said outer groove of each of said sides being surrounded by a circular grooveles means for sealing the turntable sheet to a record on a first side and for sealing the turntable sheet to the turntable body on an opposite side, whereby attractive vacuum force acts effectively;

a plurality of through-holes communicating between at least one of said grooves on each of the sides provided in said turntable sheet;

the diameter of each of said outer grooves being selected to attract a phonograph record of one of said first and second different predetermined sizes when each of said sides is in contact with said phonograph record.

51. A turntable sheet as claimed in claim 50, wherein said through-holes are made along said radial grooves on said both sides.

* * * * *